United States Patent
Wang

(10) Patent No.: US 11,333,382 B2
(45) Date of Patent: May 17, 2022

(54) SYSTEM FOR HEATING, VENTILATION, AIR-CONDITIONING

(71) Applicant: Siemens Schweiz AG, Zürich (CH)

(72) Inventor: Shuo Wang, Gelfingen (CH)

(73) Assignee: SIEMENS SCHWEIZ AG, Zurich (CH)

( * ) Notice: Subject to any disclaimer, the term of this patent is extended or adjusted under 35 U.S.C. 154(b) by 14 days.

(21) Appl. No.: 16/931,671

(22) Filed: Jul. 17, 2020

(65) Prior Publication Data
US 2021/0018207 A1 Jan. 21, 2021

(30) Foreign Application Priority Data
Jul. 19, 2019 (EP) .................................... 19187260

(51) Int. Cl.
*F24F 11/58* (2018.01)
*F24F 11/63* (2018.01)
*F24F 11/30* (2018.01)
*F24F 120/14* (2018.01)

(52) U.S. Cl.
CPC .............. *F24F 11/58* (2018.01); *F24F 11/30* (2018.01); *F24F 11/63* (2018.01); *F24F 2120/14* (2018.01)

(58) Field of Classification Search
CPC .. F24F 11/58; F24F 11/63; F24F 11/30; F24F 2120/14; F24F 11/62; F24F 11/80; F24F 11/61; G05B 2219/2642; G05B 15/02; G06N 3/0454; G06N 3/08
See application file for complete search history.

(56) References Cited

U.S. PATENT DOCUMENTS

| 10,364,996 B2* | 7/2019 | Zhao | F24F 11/30 |
| 2011/0042055 A1* | 2/2011 | Bauer | F24F 3/0522 |
| | | | 165/222 |
| 2014/0209269 A1* | 7/2014 | Goenka | B60H 1/32281 |
| | | | 165/42 |
| 2015/0156031 A1* | 6/2015 | Fadell | G08B 19/005 |
| | | | 700/276 |

(Continued)

FOREIGN PATENT DOCUMENTS

| EP | 2911018 | 8/2015 | ............. G05B 15/02 |
| WO | 2013/105087 | 7/2013 | ............. G05B 13/04 |

(Continued)

*Primary Examiner* — Ramesh B Patel
(74) *Attorney, Agent, or Firm* — Slayden Grubert Beard PLLC

(57) ABSTRACT

Various embodiments include a site controller comprising: a processor; a memory storing a parametrized model for control of a HVAC system; a sensor interface connected to a first sensor; an actuator interface connected to a first actuator; and a cloud interface connected to a remote controller. The processor is configured to: read a first set of sensor signals from the first sensor; process the first set of signals into a set of measured values; transmit the measured values to the remote controller; in response, receive a set of model parameters from the remote controller; read the parametrized model from the memory; read an additional sensor signal from the first sensor; compute an actuator setting signal from the additional signal using the parametrized model and the set of model parameters; and transmit the actuator setting signal to the first actuator.

15 Claims, 4 Drawing Sheets

(56) References Cited

U.S. PATENT DOCUMENTS

| | | | | |
|---|---|---|---|---|
| 2015/0253022 A1* | 9/2015 | Niazi | ........................ | C12Q 3/00 |
| | | | | 165/59 |
| 2015/0344044 A1* | 12/2015 | Yuasa | ................ | B60H 1/00821 |
| | | | | 165/11.1 |
| 2017/0059199 A1* | 3/2017 | Zhang | ................ | B60H 1/00807 |
| 2018/0120788 A1* | 5/2018 | Billings | ............. | G05B 13/0255 |

FOREIGN PATENT DOCUMENTS

| | | | | |
|---|---|---|---|---|
| WO | 2014/059123 | 4/2014 | ............. | F24F 11/00 |
| WO | 2016/066822 | 5/2016 | ............. | G01S 13/00 |
| WO | 2018/200861 | 11/2018 | | |

\* cited by examiner

SYSTEM FOR HEATING, VENTILATION, AIR-CONDITIONING

CROSS-REFERENCE TO RELATED APPLICATIONS

This application claims priority to EP Application No. 19187260.5 filed Jul. 19, 2019, the contents of which are hereby incorporated by reference in their entirety.

TECHNICAL FIELD

The present disclosure relates to a system for heating, ventilation, and/or air-conditioning. Various embodiments of the teachings herein include control systems and/or methods for heating, ventilation, and/or air-conditioning using artificial intelligence.

BACKGROUND

Systems for heating, ventilation, and/or air-conditioning (HVAC) typically comprise a plurality of sensors as well as a plurality of actuators. The sensors of the system can include, but are not limited to, temperature sensors, humidity sensors, air quality sensors, sensors for detecting occupant movement etc. A plethora of technical approaches such as infrared sensors, ultrasonic sensors and/or surveillance cameras afford detection of occupant movement. The actuators of the HVAC system can include, by way of non-limiting example, valves of thermal heat exchangers, dampers, fans etc.

Patent application WO2014/059123A1 describes a two-stage optimization scheme for HVAC demand response. The optimization scheme in a first stage performs computationally intensive optimizations for weather patterns. These calculations can be performed off-line. A knowledge base is generated from the results of the off-line computations. In a second stage, a simulation evaluation for each candidate strategy in the knowledge base identifies a best strategy.

Patent application WO2018/200861A1 describes a building energy system with stochastic model predictive control. A planning system 700 having a demand response optimizer 630 is disclosed. The demand response optimizer 630 can use building loads and utility rates. The building loads and the utility rates are used to determine an optimal resource allocation and to minimize cost over a simulation period. To that end, the demand response optimizer 630 comprises a high-level optimizer 632 as well as a low-level optimizer 634. Whilst the low-level optimizer 634 works at the equipment level, the high-level optimizer 632 controls resource allocation at an outer level.

Patent application WO2013/105087A1 describes a chiller 26 having a chiller controller 28 connects to a control center 14 via a communication channel 38. A network 34 connects the control center to an intelligence center 12. The intelligence center 12 prepares a chiller activation plan and transmits that plan to the control center 14. The activation plan is then implemented by, for example, controlling a rate of transport of a heated or cooled fluid to or from the chiller 26.

SUMMARY

The present disclosure teaches use of artificial intelligence to improve on control of heating, ventilation, and/or air-conditioning. The present disclosure describes, among other things, a local installation assisted by the cloud, the cloud performing artificial intelligence computations.

For example, some embodiments of the teachings herein include a site controller (6) comprising a processor, a memory storing a parametrized model (9, 26) for control of a heating, ventilation, air-conditioning installation (3a-3e, 4a-4e, 5a-5d) associated with the site (1), a sensor interface configured to establish a connection to at least one first sensor (5a-5d), an actuator interface configured to establish a connection to at least one first actuator (3a-3e, 4a-4e), a cloud interface configured to establish a connection to a remote controller (8), the remote controller (8) being located remotely from the site controller (6), the processor being configured to: read a first set of sensor signals from the at least one first sensor (5a-5d) via the sensor interface; process the first set of sensor signals into a first set of measured values; transmit the first set of measured values to the remote controller (8) via the cloud interface; in consequence of the transmittal of the first set of measured values, receive a set of model parameters from the remote controller (8) via the cloud interface; read the parametrized model (9, 26) from the memory; read at least one additional first sensor signal from the at least one first sensor (5a-5d) via the sensor interface; compute at least one actuator setting signal from the at least one additional first sensor signal using the parametrized model (9, 26) and using the set of model parameters; and transmit the at least one actuator setting signal to the at least one first actuator (3a-3e, 4a-4e) via the actuator interface.

In some embodiments, the processor is configured to: produce a first set of timestamp values wherein each timestamp value is associated with a sensor signal of the first set of sensor signals; and transmit the first set of timestamp values to the remote controller (8) via the cloud interface.

In some embodiments, the sensor interface is configured to establish a connection to at least one second sensor (5a-5d), wherein the at least one second sensor (5a-5d) comprises at least one motion sensor, the processor being configured to: read a second set of sensor signals from the at least one second sensor (5a-5d) via the sensor interface; wherein each sensor signal of the second set of sensor signals is indicative of occupant movement; process the second set of sensor signals into a second set of measured values; and transmit the second set of measured values to the remote controller (8) via the cloud interface.

In some embodiments, the processor is configured to: produce a second set of timestamp values wherein each timestamp value is associated with a sensor signal of the second set of sensor signals; and transmit the second set of timestamp values to the remote controller (8) via the cloud interface.

In some embodiments, the processor is configured to: read at least one additional second sensor signal from the at least one second sensor (5a-5d) via the sensor interface; wherein the at least one additional second sensor signal is indicative of occupant movement; and compute the at least one actuator setting signal also as a function of the at least one additional second sensor signal.

In some embodiments, the processor is configured to: apply the set of model parameters to the parametrized model (9, 26) to produce an updated, parameterized model (9, 26); and store the updated, parametrized model (9, 26) in the memory.

In some embodiments, the sensor interface is a wireless sensor interface and is configured to establish a wireless connection to the at least one first sensor (5a-5d), the processor being configured to read the first set of sensor signals from the at least one first sensor (5a-5d) via the wireless sensor interface.

In some embodiments, the sensor interface is a wireless sensor interface and is configured to establish a wireless connection to the at least one second sensor (5a-5d), the processor being configured to read the second set of sensor signals from the at least one second sensor (5a-5d) via the wireless sensor interface.

In some embodiments, the actuator interface is a wireless actuator interface and is configured to establish a wireless connection to the at least one first actuator (3a-3e, 4a-4e), the processor being configured to transmit the at least one actuator setting signal to the at least one first actuator (3a-3e, 4a-4e) via the wireless actuator interface.

In some embodiments, the wireless sensor interface is configured to produce signals indicative of occupant movement, the processor being configured to: read a third set of signals directly from the wireless sensor interface; wherein at least one signal of the third set of signals is indicative of occupant movement; process the third set of signals into a third set of measured values; and transmit the third set of measured values to the remote controller (8) via the cloud interface.

In some embodiments, the wireless actuator interface is configured to produce signals indicative of occupant movement, the processor being configured to: read a fourth set of signals directly from the wireless actuator interface; wherein at least one signal of the fourth set of actuator signals is indicative of occupant movement; process the fourth set of actuator signals into a fourth set of measured values; and transmit the fourth set of measured values to the remote controller (8) via the cloud interface.

In some embodiments, the cloud interface is a wireless cloud interface and is configured to produce signals indicative of occupant movement, the processor being configured to: read a fifth set of signals directly from the wireless cloud interface; wherein at least one signal of the fifth set of signals is indicative of occupant movement; process the fifth set of signals into a fifth set of measured values; and transmit the fifth set of measured values to the remote controller (8) via the wireless cloud interface.

As another example, some embodiments include a system comprising at least one first sensor (5a-5d), at least one first actuator (3a-3e, 4a-4e) and a site controller (6) as described herein; wherein the site controller (6) is in operative communication with the at least one first sensor (5a-5d) via the sensor interface; wherein the site controller (6) is in operative communication with the at least one first actuator (3a-3e, 4a-4e) via the actuator interface; and wherein the at least one actuator setting signal upon receipt of the at least one actuator setting signal by the at least one first actuator (3a-3e, 4a-4e) causes the at least one first actuator (3a-3e, 4a-4e) to change a setting of the at least one first actuator (3a-3e, 4a-4e).

As another example, some embodiments include a method of controlling a site (1), the site (1) comprising at least one first local sensor (5a-5d), at least one first local actuator (3a-3e, 4a-4e), a local sensor interface, a local actuator interface, a local cloud interface, and a local memory, the method comprising the steps of: reading a first set of sensor signals from the at least one first local sensor (5a-5d) via the local sensor interface; processing the first set of sensor signals into a first set of measured values; transmitting the first set of measured values to a remote controller (8) via the local cloud interface, the remote controller (8) being located remotely from the at least one first local sensor (5a-5d), from the at least one first local actuator (3a-3e, 4a-4e), from the local sensor interface, from the local actuator interface, from the local cloud interface, and from the local memory; in consequence of the transmittal of the first set of measured values, receiving a set of model parameters from the remote controller (8) via the local cloud interface; reading a parametrized model (9, 26) from the local memory; applying the set of model parameters to the parametrized model (9, 26) to produce an updated, parameterized model (9, 26); reading at least one additional first sensor signal from the at least one first local sensor (5a-5d) via the local sensor interface; computing at least one actuator setting signal from the at least one additional first sensor signal using the updated, parameterized model (9, 26); and transmitting the at least one actuator setting signal to the at least one first local actuator (3a-3e, 4a-4e) via the local actuator interface.

As another example, some embodiments include a non-transitory, computer-readable medium containing a program which executes the steps of a method as described herein.

As another example, some embodiments include a site controller (6) comprising a processor, a memory storing a parametrized model (9, 26) for control of a heating, ventilation, air-conditioning installation (3a-3e, 4a-4e, 5a-5d) associated with the site (1), a sensor interface configured to establish a connection to at least one first sensor (5a-5d), wherein the sensor interface is a wireless sensor interface and is configured to establish a wireless connection to the at least one first sensor (5a-5d), an actuator interface configured to establish a connection to at least one first actuator (3a-3e, 4a-4e), a cloud interface configured to establish a connection to a remote controller (8), the remote controller (8) being located remotely from the site controller (6), the processor being configured to: read a first set of sensor signals from the at least one first sensor (5a-5d) via the wireless sensor interface; process the first set of sensor signals into a first set of measured values; transmit the first set of measured values to the remote controller (8) via the cloud interface; characterized in that the processor is configured to: read a third set of signals directly from the wireless sensor interface; wherein at least one signal of the third set of signals is indicative of occupant movement; process the third set of signals into a third set of measured values; transmit the third set of measured values to the remote controller (8) via the cloud interface; in consequence of the transmittal of the first set of measured values, receive a set of model parameters from the remote controller (8) via the cloud interface; read the parametrized model (9, 26) from the memory; read at least one additional first sensor signal from the at least one first sensor (5a-5d) via the sensor interface; compute at least one actuator setting signal from the at least one additional first sensor signal using the parametrized model (9, 26) and using the set of model parameters; and transmit the at least one actuator setting signal to the at least one first actuator (3a-3e, 4a-4e) via the actuator interface.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
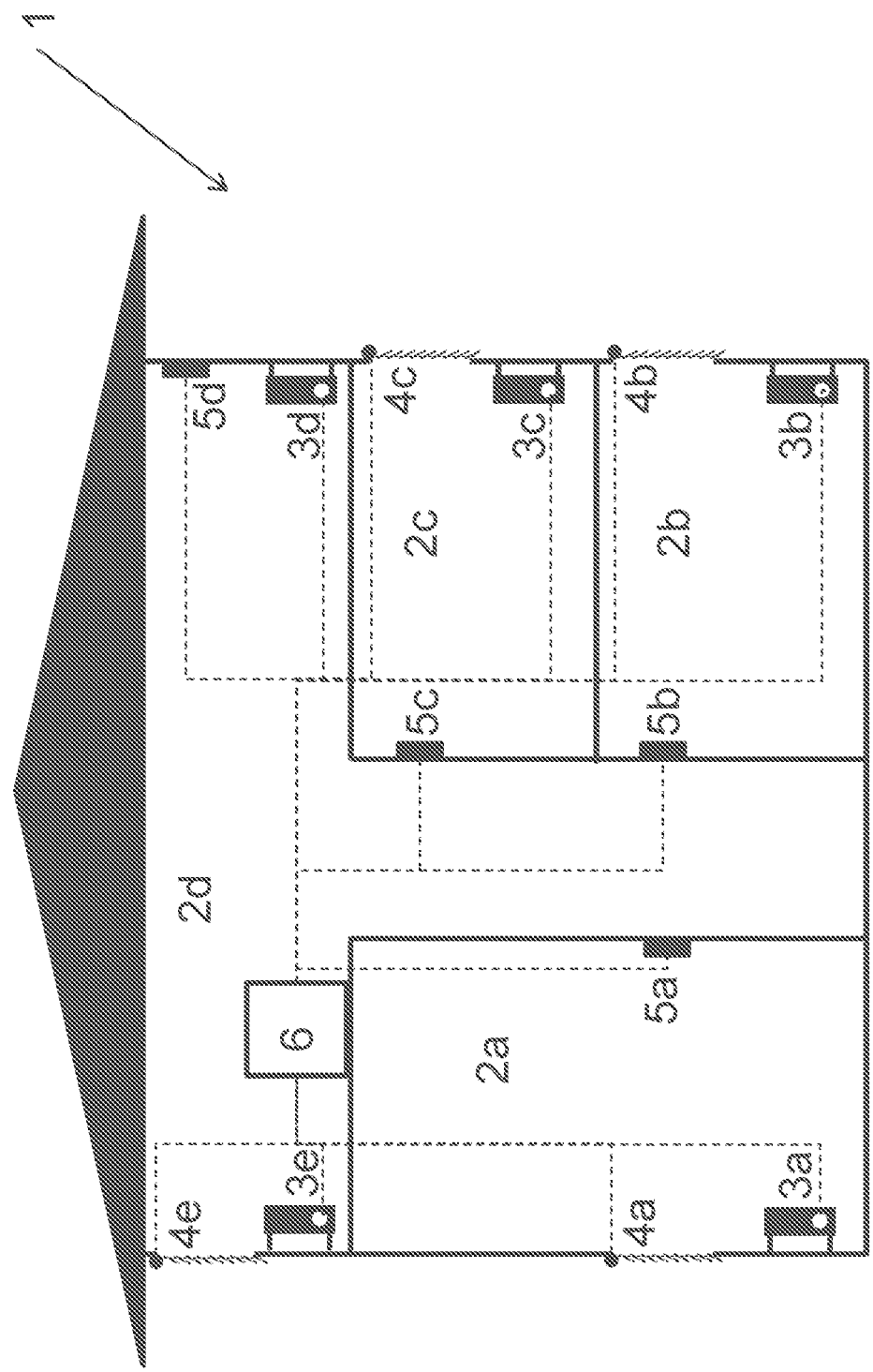
FIG. 1 shows a building having various field devices and sensors. The building also has a site controller.

The instant disclosure describes the use of a cloud computer to train an artificial intelligence model. In some embodiments, a site controller collects data from sensors and/or from actuators. The site controller has an interface to forward such data to a cloud computer. The cloud computer then separates test data and training data. The cloud computer relies on the training data to train the artificial intelligence model. In some embodiments, the cloud computer employs the test data to verify the model. In so doing, the cloud computer optimizes a cost function measuring a deviation of a computed output from an expected output. The training process results in a set of parameters such as weights, activation function, and/or connections between neurons. Upon completion of the training process, the parameters are returned to the site controller. In some embodiments, the site controller updates an artificial intelligence model based on the data returned from the cloud computer. The site controller finally computes a set point in accordance with the updated model.

In some embodiments, a site controller has only limited resources for computation. It is envisaged that the site controller comprises a thermostat or a smart thermostat.

In some embodiments, the methods differentiate between fast processes and slow processes when setting up the artificial intelligence model. Fast changes in room temperature can, by way of non-limiting example, be caused by occupants leaving or returning home. To that end, a sensor can be an occupancy detection sensor such as an infrared sensor and/or an ultrasonic sensor. Slow changes in room temperature can, by of another non-limiting example, be caused by seasons of the year.

In some embodiments, the system respects privacy. To that end, data sent to and returned from the cloud computer are encrypted. In some embodiments, the site controller uses a predefined communication bus protocol combined with a symmetric or with an asymmetric encryption algorithm to transfer data.

In some embodiments, the system handles a wide range of field devices. The system can, by way of non-limiting example, operate actuators such as fans, heating or cooling coils, valves, dampers, etc. In some embodiments, the site controller relies on established communication busses and on established communication bus protocols to transmit signals to such field devices.

In some embodiments, the system harnesses sophisticated ways of data acquisition. The site controller can, for instance, collect data from sensors of a drone in operation. The drone can send the site controller data such as images of a site and/or weather data. The site controller uses such data to provide more nuanced control and/or to improve on granularity.

In some embodiments, the site controller is capable of hazard mode. The site controller can then receive from a cloud computer a hazard signal indicative of a natural calamity, civil disorder, strike, or the like. The site controller upon receipt of a hazard signal switches to hazard mode. In hazard mode, the site controller needs not rely on permanent access to the internet.

In some embodiments, the computer program product enables operation of the HVAC system regardless of the location of the cloud computer. The cloud computer and/or the site controller can, by way of non-limiting example, rely on operating-system-level virtualization to perform computations.

The site 1 as shown in FIG. 1 could be any commercial, residential, and/or industrial building. The site 1 comprises a plurality of spaces 2a-2d such as rooms. The spaces 2a-2d of the site 1 come with actuators 3a-3e, 4a-4e. The spaces 2a-2d also have sensors 5a-5d. The actuators 3a-3e as shown in FIG. 1 are valve actuators of room heaters or cooling devices or heating and cooling devices such as fan coil units. The actuators 4a-4e actuate window blinds. Other actuators such as damper actuators for ducts can be employed. They can be commissioned in accordance with the embodiments disclosed herein.

The sensors 5a-5d are, by way of non-limiting example, thermometers, pressure sensors, humidity sensors, lighting sensors, presence detectors, air quality sensors, sensors for particulate matter or any combination thereof. In some embodiments, the sensors 5a-5d are provided by a thermostat, by a smart thermostat or by another room unit or by a room device that measures temperature. The sensors 5a-5d can, by way of another example, also be provided by fire detectors or by alarm units. The sensors 5a-5d, can be part of standard infrastructure such as computers or internet routers with temperature sensors etc.

In some embodiments, at least one of the actuators 3a-3e, 4a-4e or at least one of the sensors 5a-5d is operable to estimate and/or to determine its location. To that end, the device 3a-3e, 4a-4e, 5a-5d can have a circuit component for satellite navigation such as a global positioning system (GPS). The device 3a-3e, 4a-4e, 5a-5d can also have a circuit component harnessing another technology for navigation or object location. The device 3a-3e, 4a-4e, 5a-5d can also use a sensor for particulate matter to estimate its location. High levels of particulate matter could, for instance, indicate the device is close to a door or close to a window. In this case, high levels of particulate matter would be due to polluted outdoor air.

In some embodiments, an actuator 3a-3e, 4a-4e or a sensor 5a-5d measures signal strengths of wireless signals. The device 3a-3e, 4a-4e, 5a-5d then uses triangulation to determine its proximity to radio frequency devices nearby. An actuator 3a-3e, 4a-4e or a sensor 5a-5d can, for instance, rely on wireless internet signal strength to obtain an estimate of its location.

The actuators 3a-3e, 4a-4e and the sensors 5a-5d have interfaces to communicate with a site controller 6. It is envisaged that any communication between the site controller 6 and the actuators 3a-3e, 4a-4e and/or the sensors 5a-5d can be bidirectional or unidirectional.

Figure 2:
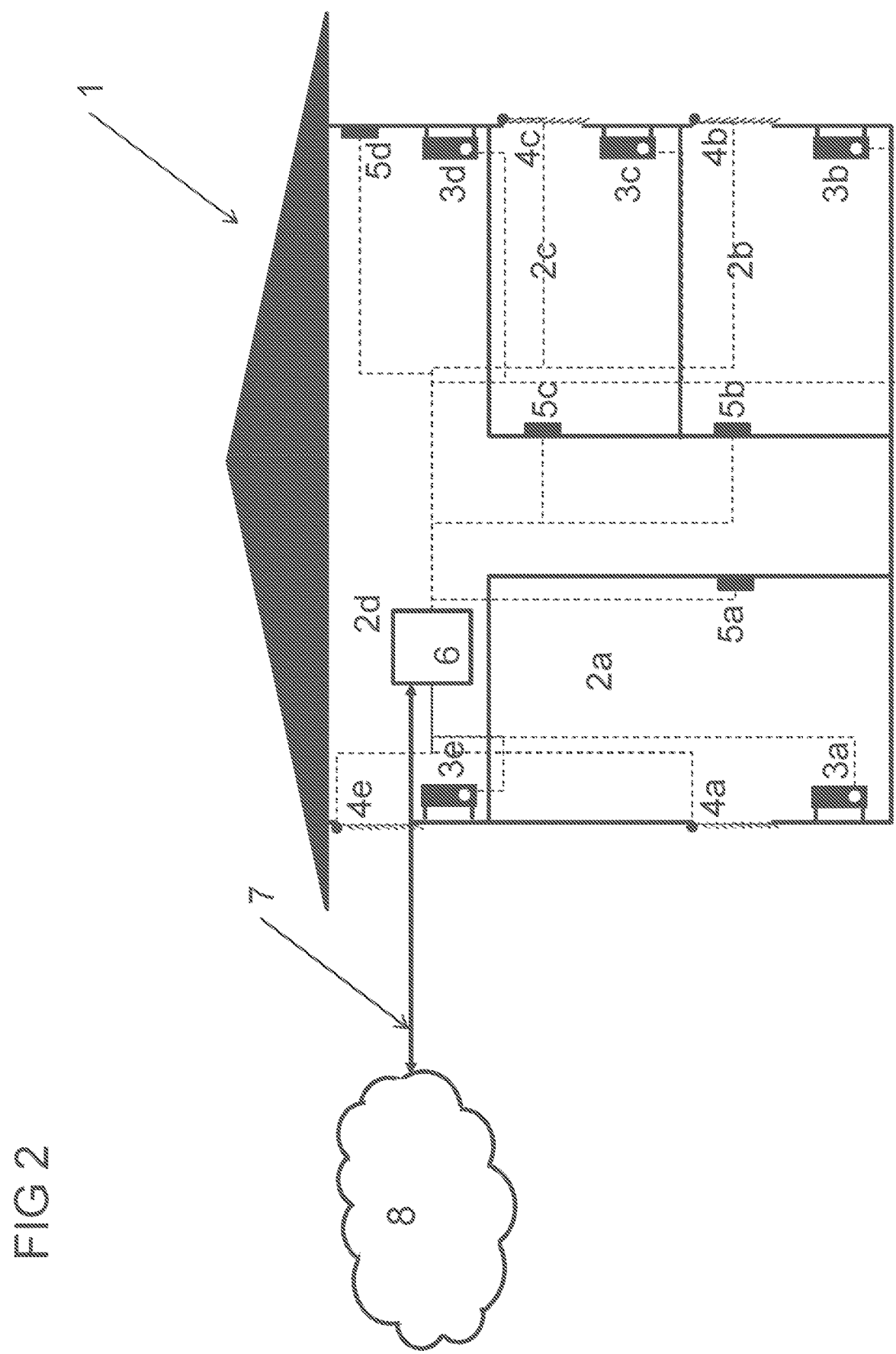
FIG. 2 schematically depicts a connection between the site controller and a cloud computer.

FIG. 1 and FIG. 2 show lines to indicate communication links between the devices of an installation 3a-3e, 4a-4e, 5a-5d. It is envisaged that at least one of the links shown in FIG. 1 and in FIG. 2 employs encryption. In some embodiments, some of the actuators 3a-3e, 4a-4e and/or some of the sensors 5a-5d capitalize on a Diffie-Hellman key exchange (or similar) to establish secure connections. In an alternate embodiment, some of the actuators 3a-3e, 4a-4e and/or some of the sensors 5a-5d employ private and public keys of suitable length to establish secure connections.

The communication interface and/or the communication controller can, for instance, rely on wireless solutions such as WLAN, KNX® RF, and/or Enocean®. Hard-wired solutions such as Ethernet® cables or on KNX® cables are also envisaged. The choice of any wireless or hard-wired solution is also influenced by bandwidth requirements. Sensors and/or actuators with video streaming functionality can, for instance, require more bandwidth than other types of field devices.

In some embodiments, the actuators 3a-3e, 4a-4e and the sensors 5a-5d and the site controller 6 all use a common communication protocol. In some embodiments, the devices of an installation rely on a protocol such as KNX®, Modbus, LON or BACnet®. The actuators 3a-3e, 4a-4e and the sensors 5a-5d and the site controller 6 can also rely on a proprietary protocol.

The site controller 6 can be a device inside the site 1. In some embodiments, the site controller 6 is arranged outside the site 1.

The interface modules of the actuators 3a-3e, 4a-4e and of the sensors 5a-5d typically carry a machine address. The machine address may be unique. The site controller 6 upon discovery of actuators 3a-3e, 4a-4e or sensors 5a-5d assigns a network address to each device 3a-3e, 4a-4e, 5a-5d. The network address is then used to send data packets from the site controller 6 to an actuator 3a-3e, 4a-4e or to a sensor 5a-5d or vice versa.

In some embodiments, the network is a TCP/IP based network. The site controller 6 accordingly assigns network addresses in accordance with a direct host configuration protocol (DHCP). In some embodiments, the site controller 6 uses a (static) lookup table to map machine addresses to network addresses.

In some embodiments, the actuators 3a-3e, 4a-4e and/or the sensors 5a-5d and/or the site controller 6 form a mesh network. A group of devices from among the actuators 3a-3e, 4a-4e and/or the sensors 5a-5d and/or the site controller 6 can also form the mesh network.

In some embodiments, the actuators 3a-3e, 4a-4e and the sensors 5a-5d rely on a low-power wide-area network (LPWAN) to establish connections. To that end, the devices 3a-3e, 4a-4e, 5a-5d can use frequency bands like 169 MegaHertz, 433 MegaHertz, 868 MegaHertz (Europe) and 915 MegaHertz (North America). In an embodiment, the low-power wide-area network makes use of license-free sub-GigaHertz radio frequency bands.

The actuators 3a-3e, 4a-4e and the sensors 5a-5d can use a low-power wide-area network to connect to the site controller 6. In this configuration, the site controller 6 is central. The actuators 3a-3e, 4a-4e and the sensors 5a-5d can also use a LPWAN to communicate amongst one another thereby forming a mesh network.

Upon establishment of the network, the site controller 6 queries (each of) the actuators 3a-3e, 4a-4e for its settings. These settings can, for instance, indicate valve positions. They can as well indicate the positions of blinds or shutters. Also, the site controller 6 queries the sensors 5a-5d for their readings. The site controller 6 can use a suitable protocol such as a file transfer protocol or a hypertext transfer protocol to obtain readings from actuator devices 3a-3e, 4a-4e and/or from sensor devices 5a-5d. In an embodiment using encryption, the site controller 6 downloads readings from actuators 3a-3e, 4a-4e and/or from sensors 5a-5d via secure copy.

FIG. 2 shows a connection between the site controller 6 and a remote controller 8 such as a cloud computer. To that end, a communication bus 7 connects the site controller 6 and the remote controller 8. It is envisaged that the communication bus affords encrypted communication.

Figure 3:
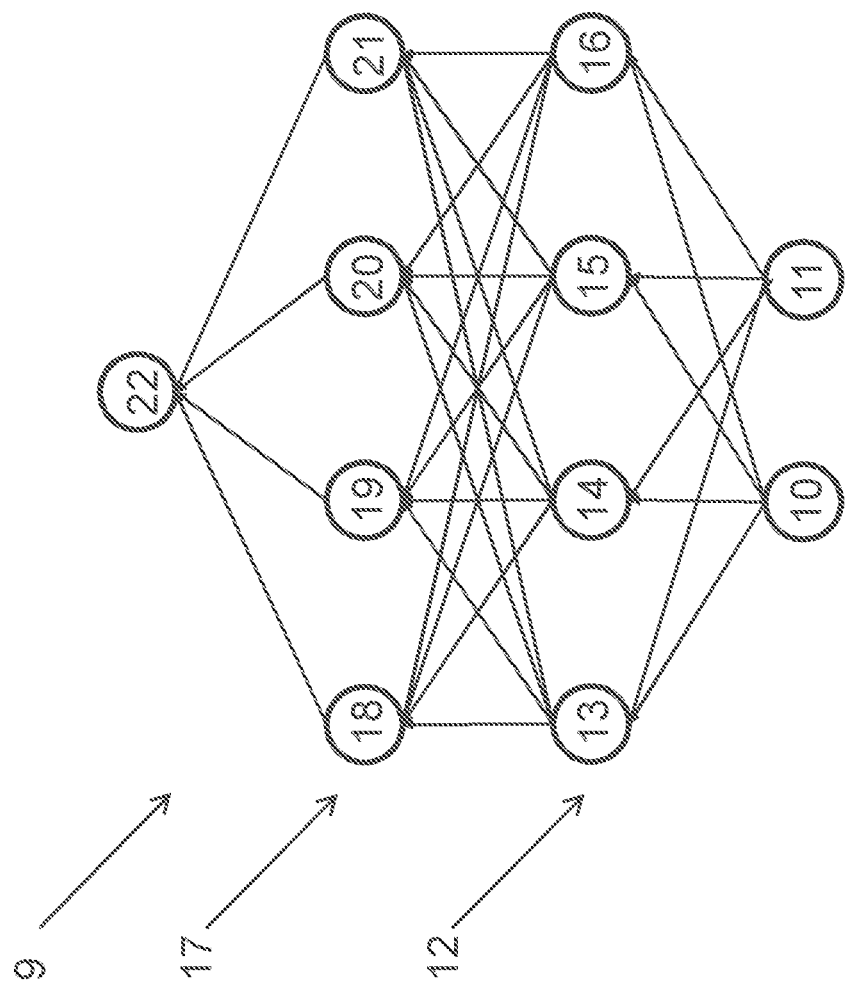
FIG. 3 shows a neural network for control of heating, ventilation and/or air-conditioning.

In some embodiments, site controller 6 and remote controller 8 implement a neural network such as the convolutional network 9 shown in FIG. 3. The network 9 comprises one or several input neurons 10-11. In some embodiments, the neural network 9 comprises at least an input neuron 10 that corresponds to (is associated with) a value indicative of temperature. The neural network 9 also comprises at least an input neuron 11 that corresponds to (is associated with) a value indicative of occupant movement. In some embodiments, the convolutional neural network 9 comprises additional input neurons for historical values of temperature and/or of occupant movement.

Any input to the neural network 9 may be normalized. The neural network 9 also comprises an output neuron 22. The output neuron can, by way of non-limiting examples, correspond to (or be associated with) a temperature set point, a blinds position, a fan speed etc. It is envisaged that the neural network 9 has a plurality of output neurons.

The network also 9 comprises several hidden layers 12, 17, each layer 12, 17 having a number of hidden neurons 13-16, 18-21. In some embodiments, the neural network 9 comprises a single layer of hidden neurons. In some embodiments, the neural network 9 comprises two layers 12, 17 of hidden neurons. The convolutional neural network 9 can also comprise more than two, more than five, or more than ten hidden layers. In some embodiments, the convolutional neural network 9 is a network susceptible to deep learning.

The neurons 10-11, 13-16, 18-22 can, by way of non-limiting example, have sigmoid and/or hyperbolic tangent and/or stepwise activation and/or rectified exponential linear unit functions. The neurons 10-11, 13-16, 18-22 may be biased. The neural network may be trained at the remote controller 8. A series of measurements obtained under various conditions by the site controller 6 is employed to train the network 9.

The neural network 9 can, by way of example, be trained by a supervised training algorithm such as backpropagation. In some embodiments, the convolutional neural network 9 is trained using an evolutionary algorithm such as a genetic algorithm. The skilled artisan can actually combine training algorithms. A genetic algorithm can, by way of example, be employed to find a coarse estimate of the weights of the connections of the neural network 9. A backpropagation algorithm is then employed to further improve on the performance of the network 9.

After training the configuration of the neural network 9 and/or the weights of the connections of the neural network 11 are sent to the site controller 6. The configuration of the neural network 9 and/or the weights of the connections of the neural network 9 define a parameterized model. The parametrized model is relied on by the site controller 6 to determine various actuator setting signals.

Figure 4:
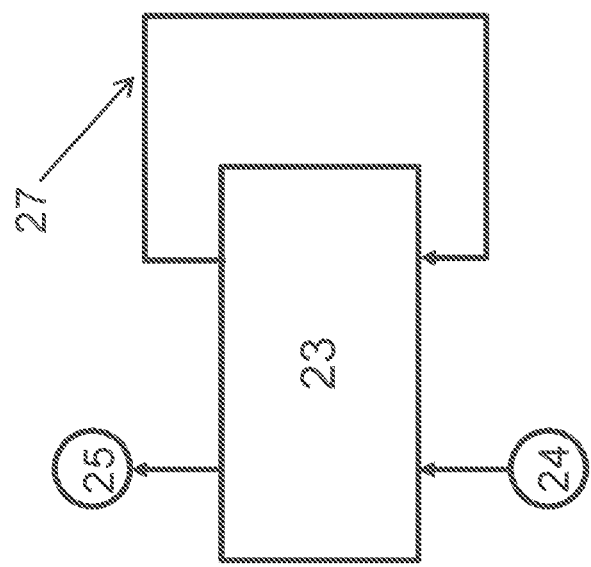
FIG. 4 shows another neural network for control of heating, ventilation and/or air-conditioning.

In some embodiments, a recurrent neural network is employed rather than the convolutional network shown in FIG. 3. Recurrent neural networks 26 such as the network shown in FIG. 4 confer benefits in terms of factoring in historical values of temperature and/or historical values of occupant motion. In a special embodiment, a recurrent neural network 26 with long-term short-term memory is employed.

In some embodiments, there is a site controller (6) comprising a processor, a memory storing a parametrized model (9, 26) for control of a heating, ventilation, air-conditioning installation (3a-3e, 4a-4e, 5a-5d) associated with the site (1), a sensor interface configured to establish a connection to at least one first sensor (5a-5d), an actuator interface configured to establish a connection to at least one first actuator (3a-3e, 4a-4e), a cloud interface configured to establish a connection to a remote controller (8), the remote controller (8) being located remotely from the site controller (6), the processor being configured to: read a first set of sensor signals from the at least one first sensor (5a-5d) via the sensor interface; process the first set of sensor signals into a first set of measured values; transmit the first set of measured values to the remote controller (8) via the cloud interface; in consequence of the transmittal of the first set of measured values, receive a set of model parameters from the remote controller (8) via the cloud interface; read the parametrized model (9, 26) from the memory; read at least one additional first sensor signal from the at least one first sensor (5a-5d) via the sensor interface; compute at least one actuator setting signal from the at least one additional first sensor signal using the parametrized model (9, 26) and using the set of model parameters; and transmit the at least one actuator setting signal to the at least one first actuator (3a-3e, 4a-4e) via the actuator interface.

In some embodiments, the processor is in operative communication with the memory, with the sensor interface, with the actuator interface, and with the cloud interface. In some embodiments, the processor is or comprises a microprocessor. In some embodiments, the processor is or comprises a microcomputer. The memory preferably is a non-volatile memory.

In some embodiments, the heating, ventilation, air-conditioning installation (3a-3e, 4a-4e, 5a-5d) associated with the site (1) is a heating, ventilation, air-conditioning installation (3a-3e, 4a-4e, 5a-5d) of the site (1). In some embodiments, the heating, ventilation, air-conditioning installation (3a-3e, 4a-4e, 5a-5d) associated with the site (1) is a heating, ventilation, air-conditioning installation (3a-3e, 4a-4e, 5a-5d) at the site (1).

The site (1) may be a building (1) such as an industrial building and/or a residential building and/or a commercial building. In some embodiments, the site (1) comprises a building (1) such as an industrial building and/or a residential building and/or a commercial building.

In some embodiments, the remote controller (8) is located at least one thousand meters, at least two thousand meters, and/or at least five thousand meters, from the site controller (6). The remote controller (8) may be located remotely from the heating, ventilation, air-conditioning installation (3a-3e, 4a-4e, 5a-5d). In some embodiments, the remote controller (8) is located at least one thousand meters, at least two thousand meters, and/or at least five thousand meters, from the heating, ventilation, air-conditioning installation (3a-3e, 4a-4e, 5a-5d). The remote controller (8) may be located remotely from the site (1). In some embodiments, the remote controller (8) is located at least one thousand meters, at least two thousand meters, and/or at least five thousand meters, from the site (1).

In some embodiments, the at least one first sensor (5a-5d) comprises at least one first sensor associated with the heating, ventilation, air-conditioning installation (3a-3e, 4a-4e, 5a-5d). In some embodiments, the at least one first sensor (5a-5d) comprises at least one first sensor of the heating, ventilation, air-conditioning installation (3a-3e, 4a-4e, 5a-5d).

As used in the instant disclosure, a parameterized model (9, 26) is a model having parameters. The output of the model can be configured by setting such parameters.

In some embodiments, the parametrized model (9, 26) comprises a parametrized artificial intelligence model such as a neural network model. The neural network can, by way of non-limiting example, be a convolutional neural network (9) and/or a recurrent neural network (26). Parameters of the neural network (9, 26) can be weights of neurons (10-11, 13-16, 18-22), flags indicating bias of neurons (10-11, 13-16, 18-22), activation functions of neurons (10-11, 13-16, 18-22), configuration data describing the topology of the network, etc. This list is not exhaustive.

In some embodiments, the set of model parameters is or comprises a plurality of model parameters. In some embodiments, the processor is configured to store the set of model parameters in the memory and/or to write the set of model parameters to the memory.

In some embodiments, the processor is configured to apply the set of model parameters to the parametrized model (9, 26); and after applying the set of model parameters, use the parametrized model (9, 26) to compute at least one actuator setting signal as a function of and/or based on and/or from the at least one additional first sensor signal.

In some embodiments, the processor is configured to compute at least one actuator setting signal using the parametrized model (9, 26) and using the received model parameters as a function of and/or based on and/or from the at least one additional first sensor signal, wherein the parametrized model (9, 26) defines the function. In some embodiments, the processor is further configured to compute at least one actuator setting signal using the parametrized model (9, 26) and using the received model parameters as a function of and/or based on and/or from the at least one additional first sensor signal, wherein the parametrized model (9, 26) and the received model parameters define the function.

In some embodiments, the processor is also configured to compute at least one actuator setting signal using the parametrized model (9, 26) and using the received model parameters as a function of and/or based on and/or from the at least one additional first sensor signal, wherein the parametrized model (9, 26) defines the function and wherein the received model parameters are parameters of the parametrized model (9, 26).

In some embodiments, the processor is configured to: apply the set of model parameters to the parametrized model (9, 26) to produce an updated, parameterized model (9, 26); and compute at least one actuator setting signal from the at least one additional first sensor signal using the updated, parameterized model (9, 26).

In some embodiments, the at least one first sensor (5a-5d) is a temperature sensor. The first set of sensor signals can be a first plurality of sensor signals. In some embodiments, the first set of sensor signals is a first set of temperature signals and/or is a first plurality of temperature signals. The first set of measured values may be a first set of temperature values and/or is a first plurality of temperature values.

In some embodiments, the at least one first sensor (5a-5d) is or comprises at least one of:
  a temperature sensor,
  a humidity sensor,
  a moisture sensor,
  an air quality sensor,
  a light sensor such as a visible light sensor,
  a human presence sensor.
The above list is not exhaustive.

In some embodiments, the cloud interface is or comprises a remote controller interface. In some embodiments, the cloud interface is configured to establish the connection to the remote controller (8) using a communication bus (7). The cloud interface may be configured to establish the connection to the remote controller (8) using a predetermined communication bus protocol. The predetermined communication bus protocol ideally is a digital communication bus protocol.

The at least one first actuator (3a-3e, 4a-4e) can, by way of non-limiting example, be or comprise:
- a valve such as a valve controlling air flow in a ducting system,
- a damper such as a damper controlling air flow in a ducting system,
- a fan such as a fan controlling air flow in a ducting system,
- a flow control component,
- an air diffuser,
- an induction device for admitting air into a space such as a room,
- an exhaust air intake for ventilating air out of a space such as a room,
- blinds,
- etc.

In some embodiments, the at least one first actuator (3a-3e, 4a-4e) comprises at least one first actuator associated with the heating, ventilation, air-conditioning installation (3a-3e, 4a-4e, 5a-5d). In some embodiments, the at least one first actuator (3a-3e, 4a-4e) comprises at least one first actuator of the heating, ventilation, air-conditioning installation (3a-3e, 4a-4e, 5a-5d).

The at least one actuator setting signal can, by way of non-limiting example, be selected from at least one of:
- a temperature set point,
- a valve position,
- a damper position,
- a speed of a fan,
- a blinds position,
- etc.

In some embodiments, the at least one actuator setting signal upon receipt of the at least one actuator setting signal by the at least one first actuator (3a-3e, 4a-4e) causes the at least one first actuator (3a-3e, 4a-4e) to change and/or to alter a setting of the at least one first actuator (3a-3e, 4a-4e). It is also envisaged that the at least one actuator setting signal upon receipt of the at least one actuator setting signal at the at least one first actuator (3a-3e, 4a-4e) causes the at least one first actuator (3a-3e, 4a-4e) to change and/or to alter a setting of the at least one first actuator (3a-3e, 4a-4e).

In some embodiments, the site controller (6) comprises at least one of:
- a room controller,
- a building controller,
- a thermostat,
- a smart thermostat,
- a smoke detector,
- a burner controller.

The above list is not exhaustive.

In some embodiments, the processor is configured to: produce a first set of timestamp values wherein each timestamp value is associated with a sensor signal of the first set of sensor signals; and transmit the first set of timestamp values to the remote controller (8) via the cloud interface.

In some embodiments, the processor is configured to: produce a first set of timestamp values wherein each timestamp value is associated with a different sensor signal of the first set of sensor signals; and transmit the first set of timestamp values to the remote controller (8) via the cloud interface.

In some embodiments, the processor is configured to: produce a first plurality of timestamp values wherein each timestamp value is associated with a sensor signal of the first set of sensor signals; and transmit the first plurality of timestamp values to the remote controller (8) via the cloud interface.

In some embodiments, the processor is configured to: produce a first plurality of timestamp values wherein each timestamp value is associated with a different sensor signal of the first set of sensor signals; and transmit the first plurality of timestamp values to the remote controller (8) via the cloud interface.

In some embodiments, the site controller (6) comprises a timer and that the processor is in operative communication with the timer. The processor is thus operable to produce a first plurality of timestamp values using the timer and/or to produce a first set of timestamp values using the timer.

In some embodiments, the sensor interface is configured to establish a connection to at least one second sensor (5a-5d), wherein the at least one second sensor (5a-5d) comprises at least one motion sensor, the processor being configured to: read a second set of sensor signals from the at least one second sensor (5a-5d) via the sensor interface; wherein each sensor signal of the second set of sensor signals is indicative of occupant movement; process the second set of sensor signals into a second set of measured values; and transmit the second set of measured values to the remote controller (8) via the cloud interface.

In some embodiments, each sensor signal of the second set of sensor signals is indicative of occupant movement and/or of people movement.

In some embodiments, the at least one second sensor (5a-5d) is a motion sensor and/or is a movement sensor and/or is an occupant movement sensor and/or is a motion detector. The second set of sensor signals can be a second plurality of sensor signals. In some embodiments, the second set of sensor signals is a second set of motion signals and/or is a second plurality of motion signals. The second set of measured values may be a second set of values indicative of occupant movement and/or is a second plurality of values indicative of occupant movement.

In some embodiments, the at least one first sensor (5a-5d) is different from the at least one second sensor (5a-5d).

In some embodiments, the processor is configured to: produce a second set of timestamp values wherein each timestamp value is associated with a sensor signal of the second set of sensor signals; and transmit the second set of timestamp values to the remote controller (8) via the cloud interface.

In some embodiments, the processor is configured to: produce a second set of timestamp values wherein each timestamp value is associated with a different sensor signal of the second set of sensor signals; and transmit the second set of timestamp values to the remote controller (8) via the cloud interface.

In some embodiments, the processor is configured to: produce a second plurality of timestamp values wherein each timestamp value is associated with a sensor signal of the second set of sensor signals; and transmit the second plurality of timestamp values to the remote controller (8) via the cloud interface.

In some embodiments, the processor is configured to: produce a second plurality of timestamp values wherein each timestamp value is associated with a different sensor signal of the second set of sensor signals; and transmit the second plurality of timestamp values to the remote controller (8) via the cloud interface.

In some embodiments, the site controller (6) comprises a timer and that the processor is in operative communication with the timer. The processor is thus operable to produce a second plurality of timestamp values using the timer and/or to produce a second set of timestamp values using the timer.

In some embodiments, the at least one second sensor (5a-5d) comprises at least one motion sensor associated with the heating, ventilation, air-conditioning installation (3a-3e, 4a-4e, 5a-5d). In some embodiments, he at least one second sensor (5a-5d) comprises at least one motion sensor of the heating, ventilation, air-conditioning installation (3a-3e, 4a-4e, 5a-5d).

In some embodiments, the processor is configured to: read at least one additional second sensor signal from the at least one second sensor (5a-5d) via the sensor interface; wherein the at least one additional second sensor signal is indicative of occupant movement; and compute the at least one actuator setting signal also as a function of the at least one additional second sensor signal.

In some embodiments, the processor is configured to compute the at least one actuator setting signal from the at least one additional first sensor signal and from the at least one additional second sensor signal using the parametrized model (9, 26) and using the set of model parameters. The at least one additional first sensor signal may be different from the at least one additional second sensor signal.

In some embodiments, the processor is configured to: apply the set of model parameters to the parametrized model (9, 26) to produce an updated, parameterized model (9, 26); and store the updated, parametrized model (9, 26) in the memory.

In some embodiments, the processor is configured to write the updated, parametrized model (9, 26) to the memory.

In some embodiments, the sensor interface is a wireless sensor interface and is configured to establish a wireless connection to the at least one first sensor (5a-5d), the processor being configured to read the first set of sensor signals from the at least one first sensor (5a-5d) via the wireless sensor interface. In some embodiments, the wireless sensor interface is a wireless, radio-frequent interface.

In some embodiments, the sensor interface is configured to establish the wireless connection to the at least one first sensor (5a-5d) using a wireless communication bus. The sensor interface may be configured to establish the wireless connection to the at least one first sensor (5a-5d) using a predetermined communication bus protocol. The predetermined communication bus protocol may be a digital communication bus protocol.

In some embodiments, the sensor interface is a wireless sensor interface and is configured to establish a wireless connection to the at least one second sensor (5a-5d), the processor being configured to read the second set of sensor signals from the at least one second sensor (5a-5d) via the wireless sensor interface.

In some embodiments, the sensor interface is configured to establish the wireless connection to the at least one second sensor (5a-5d) using a wireless communication bus. The sensor interface is preferably configured to establish the wireless connection to the at least one second sensor (5a-5d) using a predetermined communication bus protocol. The predetermined communication bus protocol may be a digital communication bus protocol.

In some embodiments, the actuator interface is a wireless actuator interface and is configured to establish a wireless connection to the at least one first actuator (3a-3e, 4a-4e), the processor being configured to transmit the at least one actuator setting signal to the at least one first actuator (3a-3e, 4a-4e) via the wireless actuator interface. The wireless actuator interface may be a wireless, radio-frequent interface.

In some embodiments, the actuator interface is configured to establish the wireless connection to the at least one first actuator (3a-3e, 4a-4e) using a wireless communication bus. The actuator interface may be configured to establish the wireless connection to the at least one first actuator (3a-3e, 4a-4e) using a predetermined communication bus protocol. The predetermined communication bus protocol may be a digital communication bus protocol.

In some embodiments, the wireless sensor interface is configured to produce signals indicative of occupant movement, the processor being configured to: read a third set of signals directly from the wireless sensor interface; wherein at least one signal of the third set of signals is indicative of occupant movement; process the third set of signals into a third set of measured values; and transmit the third set of measured values to the remote controller (8) via the cloud interface. In some embodiments, there is a wireless interface as a motion sensor. The interface thus becomes dual use. In so doing, an external motion sensor is eliminated. That is, the complexity of the system is reduced by elimination of the external motion sensor.

In an embodiment, each signal of the third set of signals is indicative of occupant movement and/or of people movement. Detection of people movement using wireless, radio-frequent interfaces is described in WO2016/066822A1, including detecting movements of objects and/or living beings in a radio range, in particular of an indoor area.

In some embodiments, the wireless actuator interface is configured to produce signals indicative of occupant movement, the processor being configured to: read a fourth set of signals directly from the wireless actuator interface; wherein at least one signal of the fourth set of actuator signals is indicative of occupant movement; process the fourth set of actuator signals into a fourth set of measured values; and transmit the fourth set of measured values to the remote controller (8) via the cloud interface.

In some embodiments, there is a wireless interface used as a motion sensor. The interface thus becomes dual use. In so doing, an external motion sensor is eliminated. That is, the complexity of the system is reduced by elimination of the external motion sensor.

In some embodiments, each signal of the fourth set of signals is indicative of occupant movement and/or of people movement.

In some embodiments, the cloud interface is a wireless cloud interface and is configured to produce signals indicative of occupant movement, the processor being configured to: read a fifth set of signals directly from the wireless cloud interface; wherein at least one signal of the fifth set of signals is indicative of occupant movement; process the fifth set of signals into a fifth set of measured values; and transmit the fifth set of measured values to the remote controller (8) via the wireless cloud interface.

In some embodiments, the wireless cloud interface comprises a wireless, radio-frequent interface. In some embodiments, the cloud interface affords communication with the remote controller (8) and also detects occupant movement and/or detects people movement.

In some embodiments, each signal of the fifth set of signals is indicative of occupant movement and/or of people movement.

In some embodiments, there is a system comprising at least one first sensor (5a-5d), at least one first actuator (3a-3e, 4a-4e) and a site controller (6) as described in the present disclosure; wherein the site controller (6) is in operative communication with the at least one first sensor (5a-5d) via the sensor interface; wherein the site controller (6) is in operative communication with the at least one first actuator (3a-3e, 4a-4e) via the actuator interface; and wherein the at least one actuator setting signal upon receipt of the at least one actuator setting signal by the at least one first actuator (3a-3e, 4a-4e) causes the at least one first actuator (3a-3e, 4a-4e) to change a setting of the at least one first actuator (3a-3e, 4a-4e).

In some embodiments, the system comprises a heating, ventilation, air-conditioning system. In some embodiments, the system comprises a heating, ventilation, air-conditioning installation (3a-3e, 4a-4e, 5a-5d).

In some embodiments, the system additionally comprises least one second sensor (5a-5d); wherein the at least one second sensor (5a-5d) comprises at least one motion sensor; wherein the site controller (6) is in operative communication with the at least one second sensor (5a-5d) via the sensor interface; and wherein the site controller (6) is a site controller (6) according to the present disclosure, the site controller (6) being configured to connect to the at least one second sensor (5a-5d) via the (sensor) interface.

In some embodiments, there is a method of controlling a site (1), the site (1) comprising at least one first local sensor (5a-5d), at least one first local actuator (3a-3e, 4a-4e), a local sensor interface, a local actuator interface, a local cloud interface, and a local memory, the method comprising the steps of: reading a first set of sensor signals from the at least one first local sensor (5a-5d) via the local sensor interface; processing the first set of sensor signals into a first set of measured values; transmitting the first set of measured values to a remote controller (8) via the local cloud interface, the remote controller (8) being located remotely from the at least one first local sensor (5a-5d), from the at least one first local actuator (3a-3e, 4a-4e), from the local sensor interface, from the local actuator interface, from the local cloud interface, and from the local memory; in consequence of the transmittal of the first set of measured values, receiving a set of model parameters from the remote controller (8) via the local cloud interface; reading a parametrized model (9, 26) from the local memory; applying the set of model parameters to the parametrized model (9, 26) to produce an updated, parameterized model (9, 26); reading at least one additional first sensor signal from the at least one first local sensor (5a-5d) via the local sensor interface; computing at least one actuator setting signal from the at least one additional first sensor signal using the updated, parameterized model (9, 26); and transmitting the at least one actuator setting signal to the at least one first local actuator (3a-3e, 4a-4e) via the local actuator interface.

In some embodiments, the method of controlling a site (1) is a method of controlling a heating, ventilation, air-conditioning installation (3a-3e, 4a-4e, 5a-5d).

In some embodiments, there is a non-transitory, computer-readable medium containing a program which executes the steps of any method according to the instant disclosure. In some embodiments, there is a non-transitory computer-readable medium having stored thereon instructions that, in response to execution, cause a system comprising a processor to perform the operations according to any method of this disclosure. In some embodiments, the computer-readable medium contains instructions that when executed perform the steps and/or perform a method according to the present disclosure. It is also envisaged that the computer-readable medium is tangible.

Any steps of a method according to the present disclosure can be embodied in hardware, in a software module executed by a processor, in a software module being executed using operating-system-level virtualization, in a cloud computing arrangement, or in a combination thereof. The software can include a firmware, a hardware driver run in the operating system, or an application program. Thus, the disclosure also relates to a computer program product for performing the operations presented herein. If implemented in software, the functions described can be stored as one or more instructions on a computer-readable medium. Some examples of storage media that can be used include random access memory (RAM), read only memory (ROM), flash memory, EPROM memory, EEPROM memory, registers, a hard disk, a removable disk, other optical disks, or any available media that can be accessed by a computer or any other IT equipment and appliance.

It should be understood that the foregoing relates only to certain embodiments of the disclosure and that numerous changes can be made therein without departing from the scope of the disclosure as defined by the following claims. It should also be understood that the disclosure is not restricted to the illustrated embodiments and that various modifications can be made within the scope of the following claims.

REFERENCE NUMERALS 1 site such as a building
2a-2d rooms
3a-3e actuators such as valve actuators of heaters, coolers and coolers/heaters
4a-4e actuators such as actuators for windows, window blinds and lights (switches, dimmers)
5a-5d sensors
6 site controller
7 communication bus
8 remote controller
9 convolutional neural network
10-11, 13-16, 18-22 neurons
12, 17 layers of the neural network
23 recurrent neural network layer
24 recurrent neural network input
25 recurrent neural network output
26 recurrent neural network
27 feedback

The invention claimed is:
1. A site controller comprising:
a processor;
a memory storing a model for control of a heating, ventilation, air-conditioning installation associated with the site;
a sensor interface configured to establish a connection to a first sensor;
an actuator interface configured to establish a connection to a first actuator;
a cloud interface configured to establish a connection to a remote controller located remotely from the site controller;
wherein the processor is configured to:
read a first set of sensor signals from the first sensor via the sensor interface;
process the first set of sensor signals into a first set of measured values;
transmit the first set of measured values to the remote controller via the cloud interface;
in response to the transmittal of the first set of measured values, receive a set of parameters from the remote controller via the cloud interface;
read the model from the memory;

read an additional sensor signal from the first sensor via the sensor interface;
compute an actuator setting signal from the additional sensor signal using the model and the set of parameters; and
transmit the actuator setting signal to the first actuator via the actuator interface.

2. The site controller according to claim 1, wherein the processor is further configured to:
produce a first set of timestamp values wherein each timestamp value is associated with a sensor signal of the first set of sensor signals; and
transmit the first set of timestamp values to the remote controller via the cloud interface.

3. The site controller according to claim 1, wherein:
the sensor interface is configured to establish a connection to a second sensor comprising a motion sensor; and
the processor is further configured to:
read a second set of sensor signals from the second sensor via the sensor interface, wherein each sensor signal of the second set of sensor signals is indicative of occupant movement;
process the second set of sensor signals into a second set of measured values; and
transmit the second set of measured values to the remote controller via the cloud interface.

4. The site controller according to claim 3, wherein the processor is further configured to:
produce a second set of timestamp values, wherein each timestamp value is associated with a sensor signal of the second set of sensor signals; and
transmit the second set of timestamp values to the remote controller via the cloud interface.

5. The site controller according to claim 3, wherein the processor is further configured to:
read an additional sensor signal from the second sensor via the sensor interface, wherein the additional sensor signal is indicative of occupant movement; and
compute the actuator setting signal a function of the additional sensor signal.

6. The site controller according to claim 1, wherein the processor is further configured to:
apply the set of parameters to the model to produce an updated model; and
store the updated model in the memory.

7. The site controller according to claim 1, wherein the sensor interface comprises a wireless sensor interface configured to establish a wireless connection to the first sensor; and
the processor is further configured to read the first set of sensor signals from the first sensor via the wireless sensor interface.

8. The site controller according to claim 3, wherein the sensor interface comprises a wireless sensor interface configured to establish a wireless connection to the second sensor; and
the processor is further configured to read the second set of sensor signals from the second sensor via the wireless sensor interface.

9. The site controller according to claim 1, wherein the actuator interface comprises a wireless actuator interface configured to establish a wireless connection to the first actuator; and
the processor is further configured to transmit the actuator setting signal to the first actuator via the wireless actuator interface.

10. The site controller according to claim 7, wherein the wireless sensor interface is configured to produce signals indicative of occupant movement; and
the processor is further configured to:
read a third set of signals directly from the wireless sensor interface;
wherein at least one signal of the third set of signals is indicative of occupant movement;
process the third set of signals into a third set of measured values; and
transmit the third set of measured values to the remote controller via the cloud interface.

11. The site controller according to claim 9, wherein:
the wireless actuator interface is configured to produce signals indicative of occupant movement; and
the processor is further configured to:
read a fourth set of signals directly from the wireless actuator interface, wherein at least one signal of the fourth set of actuator signals is indicative of occupant movement;
process the fourth set of actuator signals into a fourth set of measured values; and
transmit the fourth set of measured values to the remote controller via the cloud interface.

12. The site controller according to claim 1, wherein:
the cloud interface comprises a wireless cloud interface configured to produce signals indicative of occupant movement; and
the processor is further configured to:
read a fifth set of signals directly from the wireless cloud interface, wherein at least one signal of the fifth set of signals is indicative of occupant movement;
process the fifth set of signals into a fifth set of measured values; and
transmit the fifth set of measured values to the remote controller via the wireless cloud interface.

13. A system comprising:
a first sensor;
a first actuator; and
a site controller in operative communication with the first sensor via a sensor interface and in operative communication with the first actuator via an actuator interface; and
wherein the site controller comprises: a processor; a memory storing a model for control of a heating, ventilation, air-conditioning installation associated with the site; and a cloud interface configured to establish a connection to a remote controller located remotely from the site controller;
wherein the processor is configured to:
read a first set of sensor signals from the first sensor via the sensor interface;
process the first set of sensor signals into a first set of measured values;
transmit the first set of measured values to the remote controller via the cloud interface;
in response to the transmittal of the first set of measured values, receive a set of parameters from the remote controller via the cloud interface;
read the model from the memory;
read an additional sensor signal from the first sensor via the sensor interface;
compute an actuator setting signal from the additional sensor signal using the model and the set of parameters; and transmit the actuator setting signal to the first actuator via the actuator interface;

wherein, upon receipt of the actuator setting signal, the first actuator changes a setting of the first actuator.

14. A method of controlling a site comprising a first local sensor, a first local actuator, a local sensor interface, a local actuator interface, a local cloud interface, and a local memory, the method comprising:

reading a first set of sensor signals from the first local sensor via the local sensor interface;

processing the first set of sensor signals into a first set of measured values;

transmitting the first set of measured values to a remote controller via the local cloud interface, the remote controller located remotely from the first local sensor, the first local actuator, the local sensor interface, the local actuator interface, the local cloud interface, and the local memory;

in response to the transmittal of the first set of measured values, receiving a set of parameters from the remote controller via the local cloud interface;

reading a model from the local memory;

applying the set of parameters to the model to produce an updated model;

reading an additional sensor signal from the first local sensor via the local sensor interface;

computing an actuator setting signal from the additional sensor signal using the updated model; and transmitting the actuator setting signal to the first local actuator via the local actuator interface.

15. A site controller comprising:

a processor;

a memory storing a model for control of a heating, ventilation, air-conditioning installation associated with the site;

a sensor interface configured to establish a connection to a first sensor, wherein the sensor interface comprises a wireless sensor interface configured to establish a wireless connection to the first sensor;

an actuator interface configured to establish a connection to a first actuator; and a cloud interface configured to establish a connection to a remote controller located remotely from the site controller;

wherein the processor is configured to:

read a first set of sensor signals from the first sensor via the wireless sensor interface;

process the first set of sensor signals into a first set of measured values;

transmit the first set of measured values to the remote controller via the cloud interface;

read a third set of signals directly from the wireless sensor interface, wherein at least one signal of the third set of signals is indicative of occupant movement;

process the third set of signals into a third set of measured values;

transmit the third set of measured values to the remote controller via the cloud interface;

in response to the transmittal of the first set of measured values, receive a set of parameters from the remote controller via the cloud interface;

read the model from the memory;

read an additional sensor signal from the first sensor via the sensor interface;

compute an actuator setting signal from the additional sensor signal using the model and the set of parameters; and transmit the actuator setting signal to the first actuator via the actuator interface.

* * * * *